(12) United States Patent
Chen et al.

(10) Patent No.: US 10,412,697 B2
(45) Date of Patent: Sep. 10, 2019

(54) TIME SYNCHRONIZATION METHOD AND SYSTEM, AND NETWORK DEVICE

(71) Applicant: Huawei Technologies Co., Ltd., Shenzhen (CN)

(72) Inventors: Cong Chen, Shenzhen (CN); Chuan Xu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/794,904

(22) Filed: Oct. 26, 2017

(65) Prior Publication Data
US 2018/0049147 A1     Feb. 15, 2018

Related U.S. Application Data

(63) Continuation of application No. PCT/CN2015/097462, filed on Dec. 15, 2015.

(30) Foreign Application Priority Data

Apr. 27, 2015  (CN) .......................... 2015 1 0204323

(51) Int. Cl.
*H04W 56/00*  (2009.01)
*H04J 3/06*  (2006.01)
*H04W 88/08*  (2009.01)
*H04W 72/04*  (2009.01)

(52) U.S. Cl.
CPC ....... *H04W 56/0015* (2013.01); *H04J 3/0644* (2013.01); *H04J 3/0682* (2013.01);
(Continued)

(58) Field of Classification Search
CPC ......... H04W 56/0015; H04W 72/0406; H04W 88/08; H04J 3/0644; H04J 3/0661; H04J 3/0682
See application file for complete search history.

(56) References Cited

U.S. PATENT DOCUMENTS

2009/0016366 A1*  1/2009  Endo .................. H04L 45/00
                                                      370/401
2009/0310485 A1*  12/2009  Averi .................. H04L 45/00
                                                      370/232
(Continued)

FOREIGN PATENT DOCUMENTS

CN      101547041 A       9/2009
CN      103404226 A       11/2013
(Continued)

OTHER PUBLICATIONS

Machine Translation and Abstract of Chinese Publication No. CN103533630, Jan. 22, 2014, 25 pages.
(Continued)

*Primary Examiner* — Michael Thier
*Assistant Examiner* — Brian P Cox
(74) *Attorney, Agent, or Firm* — Conley Rose, P.C.

(57) ABSTRACT

A time synchronization method and system, and a network device, where the method includes receiving, by a second network device, a first packet from a first network device, where the first packet includes a first service frame and a first time stamp (T1), the first service frame carries a system clock of a radio equipment control (REC), obtaining, the system clock of the REC according to the first packet, sending, according to the system clock of the REC, the first service frame extracted from the first packet to a radio equipment (RE), recording a second time stamp (T2) at which the first service frame is sent, and determining, by the second network device, a transmission delay (T) according to T=T2−T1. Hence, a delay between the REC and the RE remains unchanged.

12 Claims, 5 Drawing Sheets

(52) U.S. Cl.
CPC ......... *H04W 56/00* (2013.01); *H04W 88/085* (2013.01); *H04J 3/0661* (2013.01); *H04W 72/0406* (2013.01); *H04W 88/08* (2013.01)

(56) References Cited

U.S. PATENT DOCUMENTS

| | | | |
|---|---|---|---|
| 2010/0246487 | A1 | 9/2010 | Aoyama et al. |
| 2011/0035511 | A1* | 2/2011 | Biederman ............... G04G 7/00 709/248 |
| 2013/0100948 | A1* | 4/2013 | Irvine ................... H04J 3/0632 370/350 |
| 2013/0266323 | A1* | 10/2013 | Tan ...................... H04J 3/0682 398/115 |

FOREIGN PATENT DOCUMENTS

| | | |
|---|---|---|
| CN | 103533630 A | 1/2014 |
| CN | 103999541 A | 8/2014 |
| CN | 104507154 A | 4/2015 |
| EP | 3214879 A1 | 9/2017 |
| JP | 2010166509 A | 7/2010 |
| JP | 2010226460 A | 10/2010 |
| JP | 2011087186 A | 4/2011 |

OTHER PUBLICATIONS

Foreign Communication From a Counterpart Application, European Application No. 15890640.4, Extended European Search Report dated Mar. 28, 2018, 8 pages.
Machine Translation and Abstract of Chinese Publication No. CN103404226, Nov. 20, 2013, 22 pages.
Machine Translation and Abstract of Japanese Publication No. JP2010166509, Jul. 29, 2010, 34 pages.
"Common Public Radio Interface (CPRI); Interface Specification," CPRI Specification V2.0, Interface Specification, Oct. 1, 2004, 75 pages.
"IEEE Instrumentation and Measurement Society," IEEE Std 1588, Jul. 24, 2008, 289 pages.
Foreign Communication From a Counterpart Application, PCT Application No. PCT/CN2015/097462, English Translation of International Search Report dated Mar. 17, 2016, 2 pages.
Foreign Communication From a Counterpart Application, PCT Application No. PCT/CN2015/097462, English Translation of Written Opinion dated Mar. 17, 2016, 6 pages.
Machine Translation and Abstract of Japanese Publication No. JP2011087186, Apr. 28, 2011, 17 pages.
Foreign Communication From a Counterpart Application, Chinese Application No. 2017-556141, Chinese Office Action dated Dec. 3, 2018, 6 pages.
Foreign Communication From a Counterpart Application, Chinese Application No. 2017-556141, English Translation of Chinese Office Action dated Dec. 3, 2018, 6 pages.
Machine Translation and Abstract of Chinese Publication No. CN101547041, Sep. 30, 2009, 18 pages.
Foreign Communication From a Counterpart Application, Chinese Application No. 201510204323.7, Chinese Office Action dated Jan. 17, 2019, 7 pages.

* cited by examiner

TIME SYNCHRONIZATION METHOD AND SYSTEM, AND NETWORK DEVICE

CROSS-REFERENCE TO RELATED APPLICATIONS

This application is a continuation of International Patent Application No. PCT/CN2015/097462 filed on Dec. 15, 2015, which claims priority to Chinese Patent Application No. 201510204323.7 filed on Apr. 27, 2015. The disclosures of the aforementioned applications are hereby incorporated by reference in their entireties.

TECHNICAL FIELD

The present application relates to the field of communications technologies, and in particular, to a time synchronization method and system, and a network device.

BACKGROUND

Currently, a distributed base station is widely applied in a live network. A characteristic of the distributed base station is that a radio equipment (RE) is separated from a radio equipment control (REC), and then the two are connected using an optical fiber.

During network deployment, RECs may be deployed in a centralized manner in an equipment room to form a baseband pool, and then the RECs are connected, using optical fibers, to REs deployed on a planned site, to complete network coverage. A common public radio interface (CPRI) may be used to connect an REC to an RE, and an RE to an RE.

Generally, the CPRI has strict clock synchronization requirement and time synchronization requirement. The clock synchronization requirement may be understood as that an offset between a frequency at which an REC sends a CPRI service frame and a frequency at which an RE sends a CPRI service frame should be controlled within a particular range such that accuracy of an air interface frequency is ensured. The time synchronization requirement may be understood as that a communication delay between an REC and an RE remains unchanged.

To meet the time synchronization requirement, a communication delay between the REC and the RE may be calculated, and based on the communication delay, in a downlink direction, a downlink signal sending moment of the REC is controlled, and in an uplink direction, an uplink signal transmission delay of the RE is compensated for such that the communication delay between the REC and the RE is ensured to remain unchanged. Referring to FIG. 1, a communication delay $T_{communication} = T_a + T_b + T_c + T_d$, where $T_a$ is a delay between a time when an REC stamps a sending time stamp and a time when the REC sends a sampling signal, $T_b$ is a transmission delay of the sampling signal on an optical fiber link, $T_c$ is a delay between a time when an RE receives the sampling signal and a time when the RE stamps a receiving time stamp, and $T_d$ is a delay between the time when the RE stamps the receiving time stamp and a time when the sampling signal is transmitted to a delay test reference point. For example, a signal transmit point, that is, an antenna port, of the RE is defined as the delay test reference point.

SUMMARY

According to a time synchronization method and system, and a network device in embodiments of the present application, it is ensured that a delay between an REC and an RE remains unchanged.

In view of this, the embodiments of the present application provide the following technical solutions.

According to a first aspect, a time synchronization method is provided, where a first network device is connected to an REC, a second network device is connected to an RE, the first network device keeps its system time synchronized with the second network device's system time, and the method includes receiving, by the first network device, a service frame sent by the REC, recording, according to a system time of the first network device, a first time stamp T1 at which the service frame is received, where the service frame carries a system clock of the REC, and sending, by the first network device, a packet to the second network device, where the packet includes the service frame and the first time stamp T1, and the packet is used to notify the system clock of the REC and the first time stamp T1 to the second network device.

With reference to the first aspect, in a first possible implementation manner of the first aspect, the first network device keeps system clock synchronization with the second network device, and after the receiving, by the first network device, a service frame sent by the REC, the method further includes extracting, by the first network device, the system clock of the REC from the service frame, and calculating, by the first network device, a frequency offset according to a system clock of the first network device and the system clock of the REC, where correspondingly, the packet sent by the first network device to the second network device includes the service frame, the first time stamp T1, and the frequency offset.

According to a second aspect, a time synchronization method is provided, where a first network device is connected to an REC, a second network device is connected to an RE, the first network device keeps its system time synchronized with the second network device's system time, and the method includes receiving, by the second network device, a first packet sent by the first network device, where the first packet includes a first service frame and a first time stamp T1, the first service frame is sent by the REC to the first network device, the first service frame carries a system clock of the REC, and the first time stamp T1 is a time stamp at which the first network device receives the first service frame, obtaining, by the second network device, the system clock of the REC according to the first packet, sending, by the second network device according to the system clock of the REC, the first service frame extracted from the first packet to the RE, recording, by the second network device according to a system time of the second network device, a second time stamp T2 at which the first service frame is sent, and determining, by the second network device, a transmission delay T=T2−T1 between the first network device and the second network device.

With reference to the second aspect, in a first possible implementation manner of the second aspect, if the first network device keeps system clock synchronization with the second network device, the first packet further includes a frequency offset, and the frequency offset is calculated based on a system clock of the first network device and the system clock of the REC, obtaining, by the second network device, the system clock of the REC according to the first packet includes extracting, by the second network device, the frequency offset from the first packet, and calculating, by the second network device, the system clock of the REC according to a system clock of the second network device and the frequency offset.

With reference to the first possible implementation manner of the second aspect, in a second possible implementation manner of the second aspect, sending, by the second network device according to the system clock of the REC, the first service frame extracted from the first packet to the RE includes buffering, by the second network device, the first service frame extracted from the first packet into a memory, reading, by the second network device, the first service frame from the memory using the system clock of the REC as a reading clock, and sending the first service frame to the RE, where buffering duration of the first service frame in the memory is zero.

With reference to the second aspect or the first or the second possible implementation manner of the second aspect, in a third possible implementation manner of the second aspect, after calculating, by the second network device, a transmission delay, the method includes receiving, by the second network device, a second packet sent by the first network device, where the second packet includes a second service frame, buffering, by the second network device, the second service frame into the memory, setting a buffering duration of the second service frame to a fixed delay minus the transmission delay, determining, by the second network device, whether the buffering duration is reached, and if it is determined that the buffering duration is reached, reading, by the second network device, the second service frame from the memory using the system clock of the REC as a reading clock, and sending the second service frame to the RE.

According to a third aspect, a network device is provided, where the network device is a first network device, the first network device is connected to an REC, the first network device keeps system time synchronization with a second network device, the second network device is connected to an RE, and the first network device includes a receiving unit configured to receive a service frame sent by the REC, where the service frame carries a system clock of the REC, a recording unit configured to record, according to a system time of the first network device, a first time stamp T1 at which the service frame is received when the receiving unit receives the service frame, and a sending unit configured to send a packet to the second network device, where the packet includes the service frame and the first time stamp T1, and the packet is used to notify the system clock of the REC and the first time stamp T1 to the second network device.

With reference to the third aspect, in a first possible implementation manner of the third aspect, the first network device keeps system clock synchronization with the second network device, and the first network device further includes an extracting unit configured to extract the system clock of the REC from the service frame after the receiving unit receives the service frame, and a calculating unit configured to calculate a frequency offset according to a system clock of the first network device and the system clock of the REC, where correspondingly, the packet sent by the sending unit to the second network device includes the service frame, the first time stamp T1, and the frequency offset.

According to a fourth aspect, a network device is provided, where the network device is a second network device, the second network device is connected to an RE, the second network device keeps system time synchronization with a first network device, the first network device is connected to an REC, and the second network device includes a receiving unit configured to receive a first packet sent by the first network device, where the first packet includes a first service frame and a first time stamp T1, the first service frame is sent by the REC to the first network device, the first service frame carries a system clock of the REC, and the first time stamp T1 is a time stamp at which the first network device receives the first service frame, an obtaining unit configured to obtain the system clock of the REC using the first packet, a sending unit configured to send, according to the system clock of the REC obtained by the obtaining unit, the first service frame extracted from the first packet to the RE, a recording unit configured to record, according to a system time of the second network device, a second time stamp T2 at which the sending unit sends the first service frame, and a delay determining unit configured to determine a transmission delay T=T2−T1 between the first network device and the second network device.

With reference to the fourth aspect, in a first possible implementation manner of the fourth aspect, if the first network device keeps system clock synchronization with the second network device, the first packet further includes a frequency offset, and the frequency offset is calculated based on a system clock of the first network device and the system clock of the REC, the obtaining unit includes an extracting unit configured to extract the frequency offset from the first packet received by the receiving unit, and a calculating unit configured to calculate the system clock of the REC according to a system clock of the second network device and the frequency offset.

With reference to the first possible implementation manner of the fourth aspect, in a second possible implementation manner of the fourth aspect, the sending unit includes a buffering unit configured to buffer the first service frame extracted from the first packet into a memory, and a sending subunit configured to read the first service frame from the memory using the system clock of the REC as a reading clock, and send the first service frame to the RE, where buffering duration of the first service frame in the memory is zero.

With reference to the fourth aspect or the first or the second possible implementation manner of the fourth aspect, in a third possible implementation manner of the fourth aspect, the receiving unit is further configured to receive a second packet sent by the first network device after the delay determining unit calculates the transmission delay, where the second packet includes a second service frame, a setting unit configured to buffer the second service frame into the memory, and set buffering duration of the second service frame to a fixed delay minus the transmission delay, a duration determining unit configured to determine whether the buffering duration is reached, and a reading unit configured to when the duration determining unit determines that the buffering duration is reached, read the second service frame from the memory using the system clock of the REC as a reading clock, and send the second service frame to the RE.

According to a fifth aspect, a time synchronization system is provided, where the system includes the first network device according to the third aspect or the first possible implementation manner of the third aspect, the second network device according to any one of the fourth aspect or the first to the third possible implementation manners of the fourth aspect, an REC, and an RE, and the first network device is connected to the REC, the second network device is connected to the RE, and the first network device keeps its system time synchronized with the second network device's system time.

According to a sixth aspect, a network device is provided, where the network device is a first network device, the first network device is connected to an REC, the first network device keeps system time synchronization with a second network device, the second network device is connected to an RE, and the first network device includes a processor and a memory, where the memory is configured to store program instructions and data, and the processor is configured to read the program instructions and data that are stored in the memory to perform the operations of receiving, by the processor, a service frame sent by the REC, recording, according to a system time of the first network device, a first time stamp T1 at which the service frame is received, where the service frame carries a system clock of the REC, and sending, by the processor, a packet to the second network device, where the packet includes the service frame and the first time stamp T1, and the packet is used to notify the system clock of the REC and the first time stamp T1 to the second network device.

With reference to the sixth aspect, in a first possible implementation manner of the sixth aspect, the first network device keeps system clock synchronization with the second network device, and after receiving, by the processor, a service frame sent by the REC, the processor further performs the operations of extracting, by the processor, the system clock of the REC from the service frame, and calculating, by the processor, a frequency offset according to a system clock of the first network device and the system clock of the REC, where correspondingly, the packet sent by the processor to the second network device includes the service frame, the first time stamp T1, and the frequency offset.

According to a seventh aspect, a network device is provided, where the network device is a second network device, the second network device is connected to an RE, the second network device keeps system time synchronization with a first network device, the first network device is connected to an REC, and the second network device includes a processor and a memory, where the memory is configured to store program instructions and data, and the processor is configured to read the program instructions and data that are stored in the memory to perform the operations of receiving, by the processor, a first packet sent by the first network device, where the first packet includes a first service frame and a first time stamp T1, the first service frame is sent by the REC to the first network device, the first service frame carries a system clock of the REC, and the first time stamp T1 is a time stamp at which the first network device receives the first service frame, obtaining, by the processor, the system clock of the REC according to the first packet, sending, by the processor according to the system clock of the REC, the first service frame extracted from the first packet to the RE, recording, by the processor according to a system time of the second network device, a second time stamp T2 at which the first service frame is sent, and determining, by the processor, a transmission delay T=T2−T1 between the first network device and the second network device.

With reference to the seventh aspect, in a first possible implementation manner of the seventh aspect, if the first network device keeps system clock synchronization with the second network device, the first packet further includes a frequency offset, and the frequency offset is calculated based on a system clock of the first network device and the system clock of the REC, obtaining, by the processor, the system clock of the REC according to the first packet includes extracting, by the processor, the frequency offset from the first packet, and calculating, by the processor, the system clock of the REC according to a system clock of the second network device and the frequency offset.

With reference to the first possible implementation manner of the seventh aspect, in a second possible implementation manner of the seventh aspect, sending, by the processor according to the system clock of the REC, the first service frame extracted from the first packet to the RE includes buffering, by the processor, the first service frame extracted from the first packet into a memory, and reading, by the processor, the first service frame from the memory using the system clock of the REC as a reading clock, and sending the first service frame to the RE, where buffering duration of the first service frame in the memory is zero.

With reference to the seventh aspect or the first or the second possible implementation manner of the seventh aspect, in a third possible implementation manner of the seventh aspect, after calculating, by the second network device, a transmission delay, the processor further performs the operations of receiving, by the processor, a second packet sent by the first network device, where the second packet includes a second service frame, buffering, by the processor, the second service frame into the memory, setting a buffering duration of the second service frame to a fixed delay minus the transmission delay, determining, by the processor, whether the buffering duration is reached, and if it is determined that the buffering duration is reached, reading, by the processor, the second service frame from the memory using the system clock of the REC as a reading clock, and sending the second service frame to the RE.

According to an eighth aspect, a time synchronization system is provided, where the system includes the first network device according to the sixth aspect or the first possible implementation manner of the sixth aspect, the second network device according to the seventh aspect or any one of the first to the third possible implementation manners of the seventh aspect, an REC, and an RE, and the first network device is connected to the REC, the second network device is connected to the RE, and the first network device keeps its system time synchronized with the second network device's system time.

According to the time synchronization method and system, and the network device in the embodiments of the present application, a first network device records a first time stamp T1 at which a first service frame sent by an REC is received, uses the first time stamp T1 and the first service frame to generate a packet, and sends the packet to a second network device such that technical support is provided for the second network device to calculate a transmission delay T between the first network device and the second network device. Correspondingly, after receiving the packet, the second network device obtains a system clock of the REC according to the packet, forwards, according to the system clock of the REC, the first service frame extracted from the packet to an RE, records a second time stamp T2 at which the first service frame is forwarded to the RE, and obtains the transmission delay T=T2−T1. Such a solution provides technical support for performing delay compensation for the transmission delay using a fixed delay between the REC and the RE, and helps to ensure that the delay between the REC and the RE remains unchanged.

BRIEF DESCRIPTION OF DRAWINGS

To describe the technical solutions in the embodiments of the present application more clearly, the following briefly describes the accompanying drawings required for describing the embodiments. The accompanying drawings in the following description show merely some embodiments of the present application, and an ordinary person skilled in the art may still derive other drawings from these accompanying drawings.

DESCRIPTION OF EMBODIMENTS

In order to enable a person skilled in the art to better understand the solutions in the present application, the following describes the embodiments of the present application in more detail with reference to accompanying drawings and implementation manners.

Before describing the solutions of the embodiments of the present application, the following briefly describes application scenarios of the solutions of the embodiments of the present application first.

Figure 2:
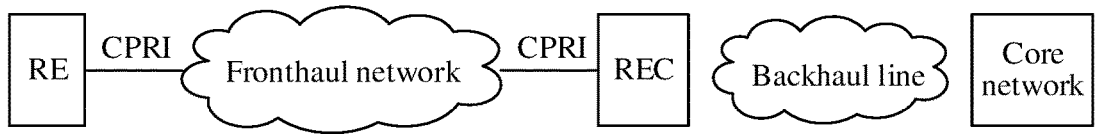
FIG. 2 is a schematic diagram of a network architecture according to an embodiment of the present application.
Figure 3:
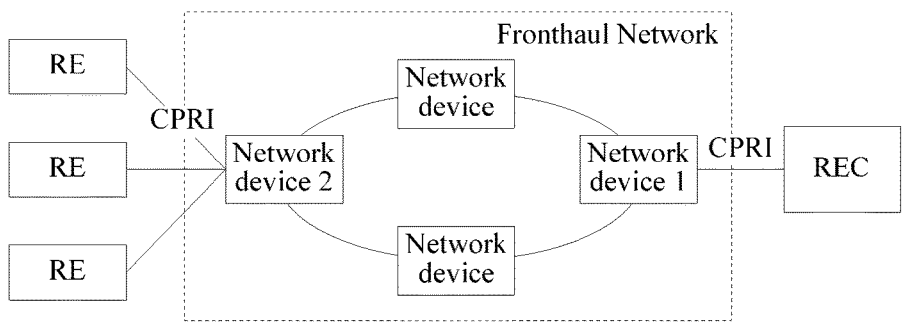
FIG. 3 is a schematic diagram of a time synchronization system according to an embodiment of the present application.

Generally, an REC is directly connected to an RE using an optical fiber. To minimize usage of optical fibers in networking, and reduce networking costs and network maintenance costs, a network architecture in combination with actual networking experience is proposed. Referring to FIG. 2, in the novel network architecture, a fronthaul network is set between an REC and an RE in order to replace a direct connected optical fiber between the REC and the RE, and a network device in the fronthaul network is configured to implement packet convergence transmission between the REC and the RE. It should be noted that, it may be known from a schematic diagram shown in FIG. 3 that the fronthaul network may include at least a network device 1 connected to the REC and a network device 2 connected to the RE. In addition, it should be further noted that as shown in FIG. 2, the REC may communicate with the RE using the fronthaul network, and may also communicate with a core network using a backhaul line.

For a solution in which packet transmission between the REC and the RE is implemented using optical fiber direct connection to meet a time synchronization requirement of a CPRI, a receive optical fiber and a transmit optical fiber that have an equal length need to be used to ensure that $T_b$ remains unchanged in order to implement the objective of making uplink and downlink compensation using a communication delay. Similarly, for a solution in which packet transmission between the REC and the RE is implemented using a network device, $T_b$ also needs to be ensured to be unchanged such that the time synchronization requirement of the CPRI is met. Therefore, the solutions of the embodiments of the present application are proposed, and the following describes implementation processes of the solutions of embodiments of the present application with reference to specific examples.

For example, a network device in the embodiments of the present application may be a standalone device, the network device may be multiple devices jointly implementing functions of a network device, that is, the functions of the network device are distributed onto the multiple devices, or the network device may be a bearing network device that integrates functions of a network device and that can implement packet forwarding, such as a packet transport network (PTN) device, a router, a switch, a microwave device, an optical transport network (OTN) device, and a synchronous digital hierarchy (SDH) device. The embodiments of the present application do not limit an existence form of the network device in a network.

Figure 4:
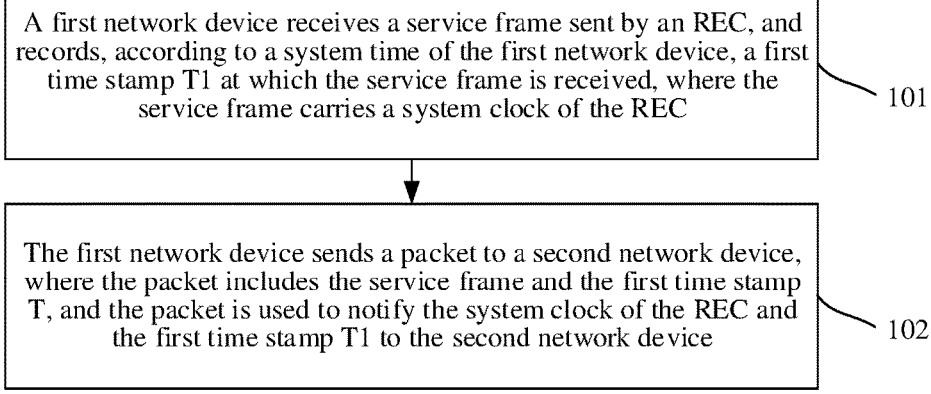
FIG. 4 is a flowchart of a time synchronization method on a first network device side according to an embodiment of the present application.

Referring to FIG. 4, FIG. 4 is a flowchart of a time synchronization method on a side of a first network device according to an embodiment of the present application. The method may include the following steps.

Step 101: The first network device receives a service frame sent by an REC, and records, according to a system time of the first network device, a first time stamp T1 at which the service frame is received, where the service frame carries a system clock of the REC.

For example, in an embodiment of the present application, the first network device may be connected to the REC, a second network device may be connected to an RE, and the first network device may be directly connected to the second network device, or the first network device may be indirectly connected to the second network device using an optical fiber or another network device. The embodiment of the present application does not limit a connection relationship between the first network device and the second network device. Referring to a schematic diagram shown in FIG. 3, the first network device may be reflected as a network device 1, the second network device may be reflected as a network device 2, and the two are indirectly connected using another network device.

To correctly calculate a transmission delay between the first network device and the second network device, system times of the first network device and the second network device should be synchronized. For example, a 1588V2 time synchronization technology may be used to implement system time synchronization between the first network device and the second network device. This may not be limited in the embodiment of the present application.

When the synchronization needs to be performed, the REC may send the service frame to the first network device according to the local system clock of the REC. Correspondingly, the first network device receives the service frame, and records, according to the local system time of the first network device, the first time stamp T1 at which the service frame is received. For example, the first network device may receive, using a first user network interface (UNI), the service frame sent by the REC.

Step 102: The first network device sends a packet to a second network device, where the packet includes the service frame and the first time stamp T1, and the packet is used to notify the system clock of the REC and the first time stamp T1 to the second network device.

For example, the first network device sends the packet to the second network device using a first network node interface (i.e., Network to Network Interface (NNI)), and the second network device receives the packet from the first network device using a second NNI.

For example, when a CPRI service from the REC is multiplexed to a high-speed data service, packaging and mapping processing need to be performed on the service frames to generate the packet. The first network device may divide the service frames into groups, perform rate adaptation for each group, and add a frame header or a packet header to generate the packet such that the packet may be scheduled to the first NNI for transmission. For example, if the first network device is a transmission device, such as a microwave device, an OTN device, or an SDH device, that integrates functions of a network device, the packet may be generated in a manner of adding a frame header. If the first network device is a packet switching device, such as a PTN device, a router, or a switch, that integrates functions of a network device, the packet may be generated in a manner of adding a packet header.

For example, the first network device may generate the packet according to at least the following two manners.

Manner 1: The first network device performs packaging and mapping on the first time stamp T1 and the service frame to generate the packet. Correspondingly, the second network device may obtain the system clock of the REC according to the packet using a system clock adaptive adjustment manner.

Optionally, the first time stamp T1 may be carried in a packet header of the packet, and the service frame may be carried in a payload of the packet, or the first time stamp T1 and the service frame may be both carried in a payload of the packet.

This may not be limited in the embodiment of the present application.

Manner 2: If the first network device still keeps system clock synchronization with the second network device, the first network device may also generate the packet in the manner that the first network device extracts the system clock of the REC from the service frame, the first network device calculates a frequency offset according to a system clock of the first network device and the system clock of the REC, and the first network device performs packaging and mapping on the frequency offset, the first time stamp T1, and the service frame to generate the packet. Correspondingly, because the first network device keeps its system clock synchronized with the second network device's system clock, the second network device may recover a service clock of the REC according to a system clock of the second network device and the frequency offset in the packet. For example, the frequency offset $\Delta f=f1-f2$, where f1 is a first frequency obtained according to the system clock of the first network device, and f2 is a second frequency obtained according to the system clock of the REC.

Optionally, the first time stamp T1 and the frequency offset may be carried in a packet header of the packet, and the service frame may be carried in a payload of the packet, or the first time stamp T1, the frequency offset, and the service frame may be all carried in a payload of the packet.

This may not be limited in the embodiment of the present application.

It should be noted that the system clock synchronization may be understood as performing frequency synchronization and phase synchronization on the system clocks of the first network device and the second network device. For example, a physical layer synchronization technology such as Synchronous Ethernet may be used, or a Precision Time Protocol (PTP) packet frequency synchronization technology may be used to implement the system clock synchronization between the system clock of the first network device and the system clock of the second network device. This may not be limited in the embodiment of the present application.

To sum up, a first network device provides technical support for a second network device for calculating a transmission delay between the first network device and the second network device such that the second network device can make delay compensation for an actual transmission delay between the two in combination with a fixed delay $T_b$, thereby ensuring that a delay between an REC and an RE remains unchanged.

Figure 5:
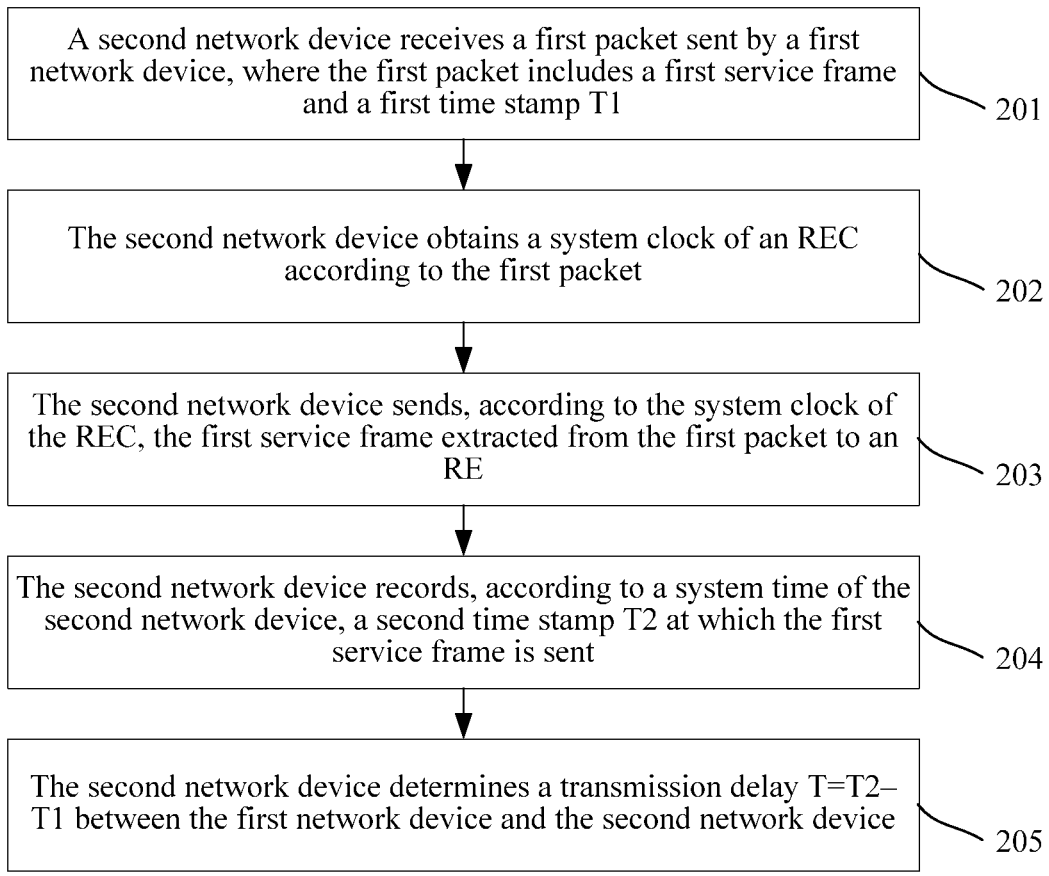
FIG. 5 is a flowchart of Embodiment 1 of a time synchronization method on a second network device side according to an embodiment of the present application.

Referring to FIG. 5, FIG. 5 is a flowchart of Embodiment 1 of a time synchronization method on a side of a second network device according to an embodiment of the present application. The method may include the following steps.

Step 201: The second network device receives a first packet sent by a first network device, where the first packet includes a first service frame and a first time stamp T1. The first service frame is sent by the REC to the first network device, the first service frame carries a system clock of the REC, and the first time stamp T1 is a time stamp at which the first network device receives the first service frame.

After the first network device sends, according to the solution shown in FIG. 4, the first packet to the second network device, if the first network device is directly connected to the second network device, the second network device may directly receive the first packet, and obtain, using the solution of the embodiment of the present application, a transmission delay, or if the first network device is indirectly connected to the second network device using other network devices, the first packet may be forwarded between the other network devices until the first packet is transmitted to the second network device that communicates with an RE, and then a transmission delay is obtained according to the solution of the embodiment of the present application.

Step 202: The second network device obtains the system clock of the REC according to the first packet.

In order that the second network device may correctly forward the first service frame from the REC to the RE, the second network device should know the system clock of the REC. Corresponding to the two manners of generating the packet in the foregoing description of FIG. 4, the second network device may obtain the system clock of the REC using the following two manners.

Manner 1: Corresponding to manner 1 of generating the packet described above, the first packet includes the first time stamp T1 and the first service frame. Correspondingly, obtaining, by the second network device, the system clock of the REC according to the first packet includes buffering, by the second network device, the first service frame extracted from the first packet into a first buffer, and obtaining, by the second network device, the system clock of the REC using a system clock adaptive adjustment manner based on a system clock of the second network device.

That is, after receiving the first packet sent by the first network device, the second network device obtains, from the first packet, a high frequency clock used when the first network device sends the first packet.

In this way, the second network device may read the first service frame from the first packet using the high frequency clock as a reading clock and buffer the first service frame into the first buffer. For example, the first buffer may be an asynchronous buffer, such as an asynchronous first in first out (FIFO) buffer.

After writing the first service frame into the first buffer, the second network device may perform system clock adaptive adjustment based on the local system clock of the second network device.

For example, the second network device may determine, according to whether the first service frame can be read, whether clock adjustment needs to be performed. If the first service frame in the first buffer cannot be read using the system clock of the second network device as a reading clock, it indicates that the system clock of the second network device is different from the system clock of the REC, and the clock adjustment needs to be performed.

For example, the second network device may also determine, according to inventory of the first service frame in the first buffer, whether the clock adjustment needs to be performed. If the inventory of the first service frame in the first buffer changes, it indicates that the system clock of the second network device is different from the system clock of the REC, and the clock adjustment needs to be performed. The inventory of the first service frame in the first buffer refers to a quantity of first service frames that are sent by the REC to the second network device and that are written into the first buffer minus a quantity of first service frames that are read by the second network device from the first buffer and that are forwarded to the RE. For example, an inventory change includes that the inventory increases. That is, within a unit time, a quantity of first service frames that are sent by the REC to the second network device is greater than a quantity of first service frames that are forwarded by the second network device to the RE. Accordingly, the second network device may determine that the system clock of the second network device is slower than the system clock of the REC. Therefore, the system clock of the second network device may be adjusted to be properly faster.

After a series of adaptive adjustments described above, if the adjusted system clock satisfies the following condition, the adjusted system clock may be determined as the system clock of the REC. The second network device can read the first service frame from the first buffer, and the inventory of the first service frame in the first buffer remains unchanged or the inventory changes within a preset allowable range.

Manner 2: Corresponding to manner 2 of generating the packet described above, the first packet includes the first time stamp T1, the frequency offset, and the first service frame. Correspondingly, obtaining, by the second network device, the system clock of the REC according to the first packet includes extracting, by the second network device, the frequency offset from the first packet, and calculating, by the second network device, the system clock of the REC according to the system clock of the second network device and the frequency offset.

For example, $\Delta f = f1 - f2$, if a third frequency f3 is obtained according to the system clock of the second network device, and the first network device keeps system clock synchronization with the second network device, it may be known that $f1 = f3$. Therefore, $f2 = f3 - \Delta f$.

Step 203: The second network device sends, according to the system clock of the REC, the first service frame extracted from the first packet to the RE.

For example, after obtaining the system clock of the REC, the second network device may send the first service frame to the RE in the following four manners.

Manner 1: Corresponding to manner 1 of obtaining the system clock of the REC described above, sending, by the second network device, the first service frame extracted from the first packet to the RE includes reading, by the second network device, the first service frame from the first buffer using the system clock of the REC as a reading clock, and sending the first service frame to the RE.

Manner 2: Corresponding to manner 2 of obtaining the system clock of the REC described above, sending, by the second network device, the first service frame extracted from the first packet to the RE includes buffering, by the second network device, the first service frame extracted from the first packet into the first buffer, reading, by the second network device, the first service frame from the first buffer using the system clock of the REC as a reading clock, and sending the first service frame to the RE, where buffering duration of the first service frame in the first buffer is zero.

Figure 6:
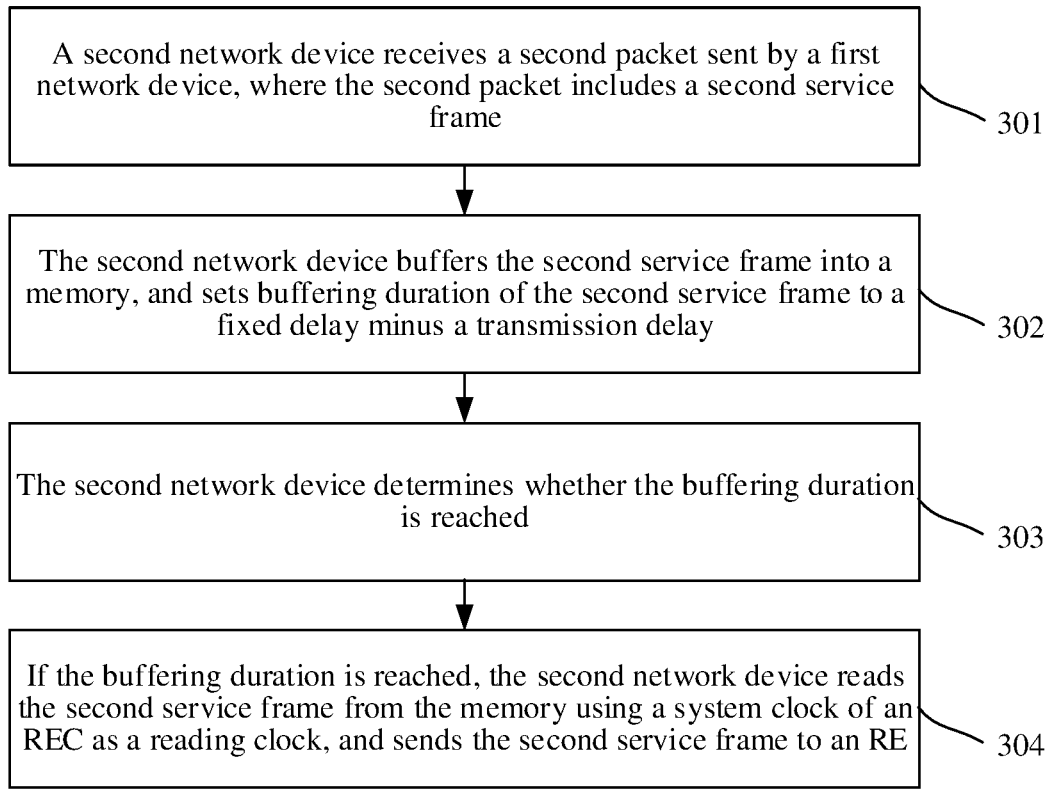
FIG. 6 is a flowchart of Embodiment 2 of a time synchronization method on a second network device side according to an embodiment of the present application.

Optionally, it may be known from the embodiment shown in FIG. 6 that, to implement query and maintenance on a delay compensation value, a second buffer may also be disposed in the second network device, and the second buffer performs buffer processing on a service frame obtained after delay compensation.

For example, the second buffer may be a synchronization buffer, such as a synchronization FIFO buffer. To improve accuracy of calculating the transmission delay in the embodiment of the present application, a process of performing delay compensation using the second buffer may be simulated. Based on this, the embodiment of the present application further provides the following manner 3 and manner 4 of sending the first service frame to the RE.

Manner 3: Corresponding to manner 1 of obtaining the system clock of the REC described above, sending, by the second network device, the first service frame extracted from the first packet to the RE includes reading, by the second network device, the first service frame from the first buffer using the system clock of the REC as a reading clock, buffering the first service frame into the second buffer, reading, by the second network device, the first service frame from the second buffer using the system clock of the REC as a reading clock, and sending the first service frame to the RE, where buffering duration of the first service frame in the second buffer is zero.

Manner 4: Corresponding to manner 2 of obtaining the system clock of the REC described above, sending, by the second network device, the first service frame extracted from the first packet to the RE includes buffering, by the second network device, the first service frame extracted from the first packet into the first buffer, reading, by the second network device, the first service frame from the first buffer using the system clock of the REC as a reading clock, buffering the first service frame into the second buffer, reading, by the second network device, the first service frame from the second buffer using the system clock of the REC as a reading clock, and sending the first service frame to the RE, where buffering duration of the first service frame in the second buffer is zero.

Step 204: The second network device records, according to a system time of the second network device, a second time stamp T2 at which the first service frame is sent.

The second network device may also record, according to the local system time, the second time stamp T2 at which the first service frame is sent to the RE when the second network device obtains the system clock of the REC and forwards the first service frame to the RE.

For example, the second network device may send the first service frame to the RE using a second UNI.

Step 205: The second network device determines a transmission delay $T = T2 - T1$ between the first network device and the second network device.

To sum up, a second network device may obtain, in combination with a local system time, a second time stamp T2 at which a first service frame is sent to an RE, and the second network device may obtain, according to a first packet, a first time stamp T1 at which a first network device receives the first service frame sent by an REC.

In this way, the second network device may know an actual transmission delay T=T2−T1 on the network devices between the REC and the RE through calculation.

Figure 1:
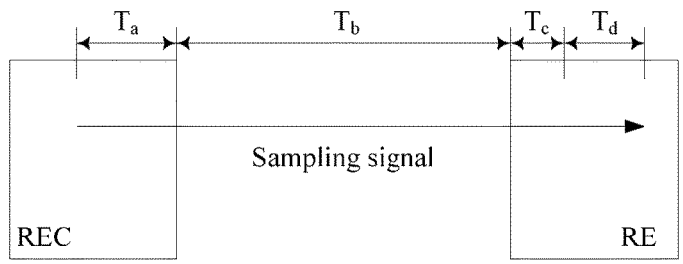
FIG. 1 is a schematic diagram of calculating a communication delay between an REC and an RE.

Further, in combination with a fixed delay between the REC and the RE, a delay compensation value for the transmission delay T may be obtained. Such a solution helps to ensure that a delay between the REC and the RE remains unchanged. For example, if a network device is used to replace an optical fiber in the network shown in FIG. 1, and $T_{communication}$ remains unchanged, the fixed delay may be reflected as $T_b$, or the fixed delay may also be reflected as another preset delay value. This may not be limited in the embodiment of the present application.

Referring to FIG. 6, FIG. 6 is a flowchart of Embodiment 2 of a time synchronization method on a side of a second network device according to an embodiment of the present application. After the second network device calculates a transmission delay T, the method may further include the following steps.

Step 301: The second network device receives a second packet sent by a first network device, where the second packet includes a second service frame.

Step 302: The second network device buffers the second service frame into the memory, and sets buffering duration of the second service frame to a fixed delay minus the transmission delay T.

Step 303: The second network device determines whether the buffering duration is reached.

Step 304: If the buffering duration is reached, the second network device reads the second service frame from the memory using the system clock of the REC as a reading clock, and sends the second service frame to an RE.

After obtaining the transmission delay T between the first network device and the second network device, the second network device may make delay compensation for the transmission delay T in a subsequent interaction process in combination with the fixed delay to ensure that the delay of the packet on the network device meets a requirement of the fixed delay, thereby ensuring that a communication delay between the REC and the RE remains unchanged.

In the subsequent interaction process, the REC may send the second service frame to the first network device according to a local system clock. The first network device receives the second service frame, and performs packaging and mapping processing on the second service frame to obtain the second packet, and sends the second packet to the second network device.

Correspondingly, after receiving the second packet, the second network device may buffer the second service frame into the memory such that the buffering duration of the second service frame may be calculated according to the fixed delay and the transmission delay T. In the embodiment of the present application, the buffering duration may be understood as wait duration of the second service frame in the memory when the fixed delay is compensated for using the transmission delay T. In this way, after the buffering duration is reached, the system clock of the REC obtained using the solution shown in FIG. 5 is used as a reading clock again to read the second service frame from the memory, and the second service frame is forwarded to the RE.

For example, the second network device may make delay compensation using the buffering duration in the following two manners making delay compensation in a timing manner. After the second service frame is written into the memory, timing may be enabled, and when the timing reaches the buffering duration, the second service frame is read from the memory. Alternatively, if the memory is an FIFO memory, delay compensation may be made in a manner of adjusting an FIFO waterline. After the second service frame is written into the memory, a waterline value is adjusted according to the buffering duration such that the delay compensation is implemented.

For example, with reference to the four manners of sending the first service frame to the RE described in FIG. 5, the second network device may buffer the second service frame into the memory using at least the following two manners.

Manner 1: Corresponding to manner 1 and manner 2 of sending the first service frame to the RE described above, the second network device has a first buffer, and the memory in the embodiment refers to the first buffer. Correspondingly, buffering, by the second network device, the second service frame into the memory includes extracting, by the second network device, the second service frame from the second packet, and buffering the second service frame into the first buffer, and setting the buffering duration of the second service frame includes setting the buffering duration of the second service frame in the first buffer.

Optionally, in an actual application, a delay compensation value may not always be unchanged. For example, a change of the fixed delay and/or a change of the transmission delay T may cause a change of the delay compensation value. Therefore, in the embodiment of the present application, the second network device may set the delay compensation value, and also may query and maintain the delay compensation value. Using an example in which delay compensation is made in the manner of adjusting an FIFO waterline, the first buffer is used as an asynchronous FIFO, and the FIFO waterline may change due to a delay variation in a packet forwarding process. Therefore, after the first buffer is used to make delay compensation once, a previous compensation value cannot be obtained accurately, that is, query and maintenance on the delay compensation value cannot be implemented accurately. Based on this, the embodiment of the present application also provides manner 2 of buffering the second service frame into the memory.

Manner 2: Corresponding to manner 3 and manner 4 of sending the first service frame to the RE described above, the second network device has a first buffer and a second buffer, and the memory in the embodiment further refers to the second buffer. Correspondingly, buffering, by the second network device, the second service frame into a memory includes extracting, by the second network device, the second service frame from the second packet, and buffering the second service frame into the first buffer, where buffering duration of the second service frame in the first buffer is zero, and reading, by the second network device, the second service frame from the first buffer using the system clock of the REC as a reading clock, and buffering the second service frame into the second buffer, and setting the buffering duration of the second service frame includes setting the buffering duration of the second service frame in the second buffer.

Still using the example in which delay compensation is made in the manner of adjusting an FIFO waterline, the second buffer is used as a synchronous FIFO, and the FIFO waterline is steady, helping implementing accurate query of a delay compensation value.

Optionally, in the solution in which the second network device has the first buffer and the second buffer, the second network device may send, according to a requirement, the first service frame to the RE using manner 1 and manner 2. This may not be limited in the embodiment of the present application.

Optionally, in the embodiment of the present application, the first network device and the second network device may be integrated into one device, or the first network device and the second network device may be reflected as two independent devices. This may not be further limited in the embodiment of the present application.

Figure 7:
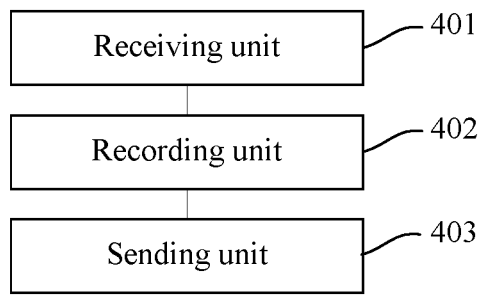
FIG. 7 is a schematic diagram of a first network device according to an embodiment of the present application.

Corresponding to the method shown in FIG. 4, an embodiment of the present application further provides a network device. Referring to a schematic diagram shown in FIG. 7, the network device is a first network device, the first network device is connected to an REC, the first network device keeps system time synchronization with a second network device, the second network device is connected to an RE, and the first network device includes a receiving unit 401 configured to receive a service frame sent by the REC, where the service frame carries a system clock of the REC, a recording unit 402 configured to record, according to a system time of the first network device, a first time stamp T1 at which the service frame is received when the receiving unit 401 receives the service frame, and a sending unit 403 configured to send a packet to the second network device, where the packet includes the service frame and the first time stamp T1, and the packet is used to notify the system clock of the REC and the first time stamp T1 to the second network device.

Optionally, the first network device keeps its system clock synchronized with the second network device's system clock, and the first network device further includes an extracting unit (not shown) configured to extract the system clock of the REC from the service frame after the receiving unit 401 receives the service frame, and a calculating unit (not shown) configured to calculate a frequency offset according to a system clock of the first network device and the system clock of the REC, where correspondingly, the packet sent by the sending unit 403 to the second network device includes the service frame, the first time stamp T1, and the frequency offset.

In the foregoing optional solution, for additional functions that may be implemented by the network device in the embodiment of the present application, refer to descriptions of the additional functions of the first network device in the method embodiment, and details are not described herein again.

In addition, when the network device provided in the foregoing embodiment performs time synchronization, division of the foregoing function modules is used as an example for illustration. In an actual application, the foregoing functions can be allocated to different function modules and implemented according to a requirement, that is, an inner structure of the network device is divided into different function modules to implement all or part of the functions described above.

Figure 8:
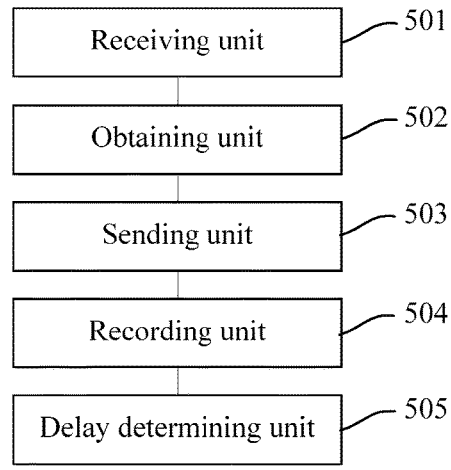
FIG. 8 is a schematic diagram of a second network device according to an embodiment of the present application.

Corresponding to the method shown in FIG. 5, an embodiment of the present application further provides a network device. Referring to a schematic diagram shown in FIG. 8, the network device is a second network device, the second network device is connected to an RE, the second network device keeps system time synchronization with a first network device, the first network device is connected to an REC, and the second network device includes a receiving unit 501 configured to receive a first packet sent by the first network device, where the first packet includes a first service frame and a first time stamp T1, the first service frame is sent by the REC to the first network device, the first service frame carries a system clock of the REC, and the first time stamp T1 is a time stamp at which the first network device receives the first service frame, an obtaining unit 502 configured to obtain the system clock of the REC according to the first packet, a sending unit 503 configured to send, using the system clock of the REC obtained by the obtaining unit 502, the first service frame extracted from the first packet to the RE, a recording unit 504 configured to record, according to a system time of the second network device, a second time stamp T2 at which the sending unit 503 sends the first service frame, and a delay determining unit 505 configured to determine a transmission delay $T=T2-T1$ between the first network device and the second network device.

Optionally, if the first network device keeps system clock synchronization with the second network device, the first packet further includes a frequency offset, where the frequency offset is calculated based on a system clock of the first network device and the system clock of the REC, and the obtaining unit 502 includes an extracting unit (not shown) configured to extract the frequency offset from the first packet received by the receiving unit 501, and a calculating unit (not shown) configured to calculate the system clock of the REC according to a system clock of the second network device and the frequency offset.

Optionally, the sending unit 503 further includes a buffering unit (not shown) configured to buffer the first service frame extracted from the first packet into a memory, and a sending subunit (not shown) configured to read the first service frame from the memory using the system clock of the REC as a reading clock, and send the first service frame to the RE, where buffering duration of the first service frame in the memory is zero.

Optionally, the receiving unit 501 is further configured to receive a second packet sent by the first network device after the delay determining unit 505 calculates the transmission delay T, where the second packet includes a second service frame, a setting unit (not shown) configured to buffer the second service frame into the memory, and set buffering duration of the second service frame to a fixed delay minus the transmission delay T, a duration determining unit (not shown) configured to determine whether the buffering duration is reached, and a reading unit (not shown) configured to when the duration determining unit determines that the buffering duration is reached, read the second service frame from the memory using the system clock of the REC as a reading clock, and send the second service frame to the RE.

In the foregoing optional solution, for additional functions that may be implemented by the network device in the embodiment of the present application, refer to descriptions of the additional functions of the second network device in the method embodiment, and details are not described herein again.

In addition, when the network device provided in the foregoing embodiment performs time synchronization, division of the foregoing function modules is used as an example for illustration. In an actual application, the foregoing functions can be allocated to different function modules and implemented according to a requirement, that is, an inner structure of the network device is divided into different function modules to implement all or part of the functions described above.

Optionally, an embodiment of the present application further provides a time synchronization system. Referring to a schematic diagram shown in FIG. 3, the system may include the first network device shown in FIG. 7, the second network device shown in FIG. 8, an REC, and an RE. The first network device is connected to the REC, the second network device is connected to the RE, and the first network device keeps its system time synchronized with the second network device's system time.

Corresponding to the method shown in FIG. 4, an embodiment of the present application further provides a first network device 550. Referring to a schematic diagram shown in FIG. 9, the first network device 550 may include a processor 551, a memory 552, a network interface 553, and a bus system 554.

The bus system 554 is configured to connect the processor 551, the memory 552, and the network interface 553.

The network interface 553 is configured to implement communication between the first network device 550 and another network device. The network interface 553 may be implemented using an optical transceiver, an electrical transceiver, a wireless transceiver, or any combination thereof. For example, the optical transceiver may be a small form-factor pluggable (SFP) transceiver, an enhanced SFP (SFP+), or a 10 Gigabit SFP (XFP) transceiver. The electrical transceiver may be an Ethernet network interface controller (NIC). The wireless transceiver may be a wireless NIC (WNIC).

The memory 552 is configured to store operating system, program instructions and data. The memory 552 may include a volatile memory, such as a random access memory (RAM), the memory 552 may also include a non-volatile memory, such as a flash memory, a hard disk drive (HDD), or a solid state disk (SSD), or the memory 552 may also include a combination of the foregoing types of memories.

The processor 551 may be a central processing unit (CPU), or may be a combination of a CPU and a hardware chip. The foregoing hardware chip may be one of or a combination of multiple of the following: an application-specific integrated circuit (ASIC), a field-programmable gate array (FPGA), a complex programmable logical device (CPLD), and a network processor (NP). The processor 551 is configured to read the program instructions and data that are stored in the memory 552 to perform the operations of receiving, by the processor 551 using the network interface 553, a service frame sent by the REC, and recording, according to a system time of the first network device, a first time stamp T1 at which the service frame is received, where the service frame carries a system clock of the REC, and sending, by the processor 551 using the network interface 553, a packet to the second network device, where the packet includes the service frame and the first time stamp T1, and the packet is used to notify the system clock of the REC and the first time stamp T1 to the second network device.

Figure 9:
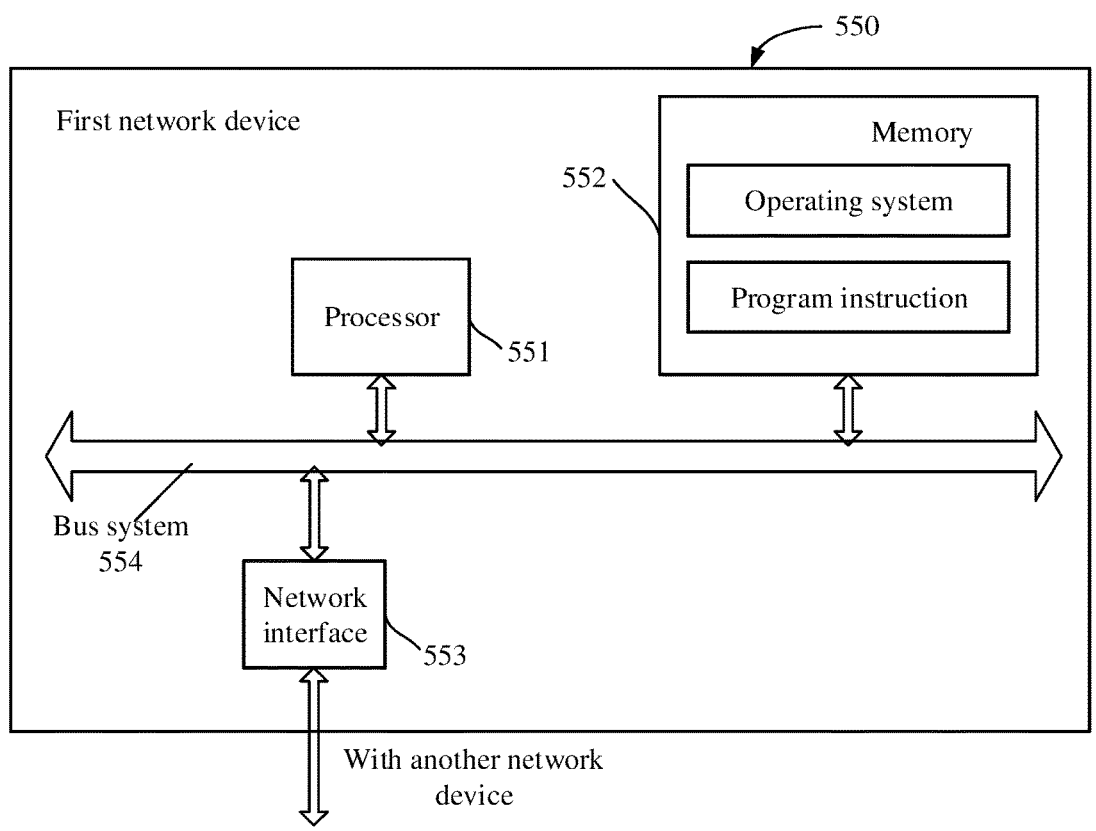
FIG. 9 is a schematic hardware composition diagram of a first network device according to an embodiment of the present application.

For implementation details of the first network device 550 shown in FIG. 9, refer to descriptions of the method embodiment shown in FIG. 4, and details are not described herein again.

Corresponding to the method shown in FIG. 5, an embodiment of the present application further provides a second network device 600. Referring to a schematic diagram shown in FIG. 10, the second network device 600 may include a processor 601, a memory 602, a network interface 603, and a bus system 604, where the bus system 604 is configured to connect the processor 601, the memory 602, and the network interface 603. The network interface 603 is configured to implement communication between the second network device 600 and another network device. The memory 602 is configured to store operating system, program instructions and data, and the processor 601 is configured to read the program instructions and data that are stored in the memory 602 to perform the operations of receiving, by the processor 601 using the network interface 603, a first packet sent by the first network device, where the first packet includes a first service frame and a first time stamp T1, the first service frame is sent by the REC to the first network device, the first service frame carries a system clock of the REC, and the first time stamp T1 is a time stamp at which the first network device receives the first service frame, obtaining, by the processor 601, the system clock of the REC according to the first packet, sending, by the processor 601 according to the system clock of the REC, the first service frame extracted from the first packet to the RE, recording, by the processor 601 according to a system time of the second network device 600, a second time stamp T2 at which the first service frame is sent, and determining, by the processor 601, a transmission delay T=T2−T1 between the first network device 550 and the second network device 600.

It should be noted that, for specific representation forms of the network interface 603, the memory 602, and the processor 601, refer to descriptions of the first network device 550 shown in FIG. 9, and details are not described herein again.

Figure 10:
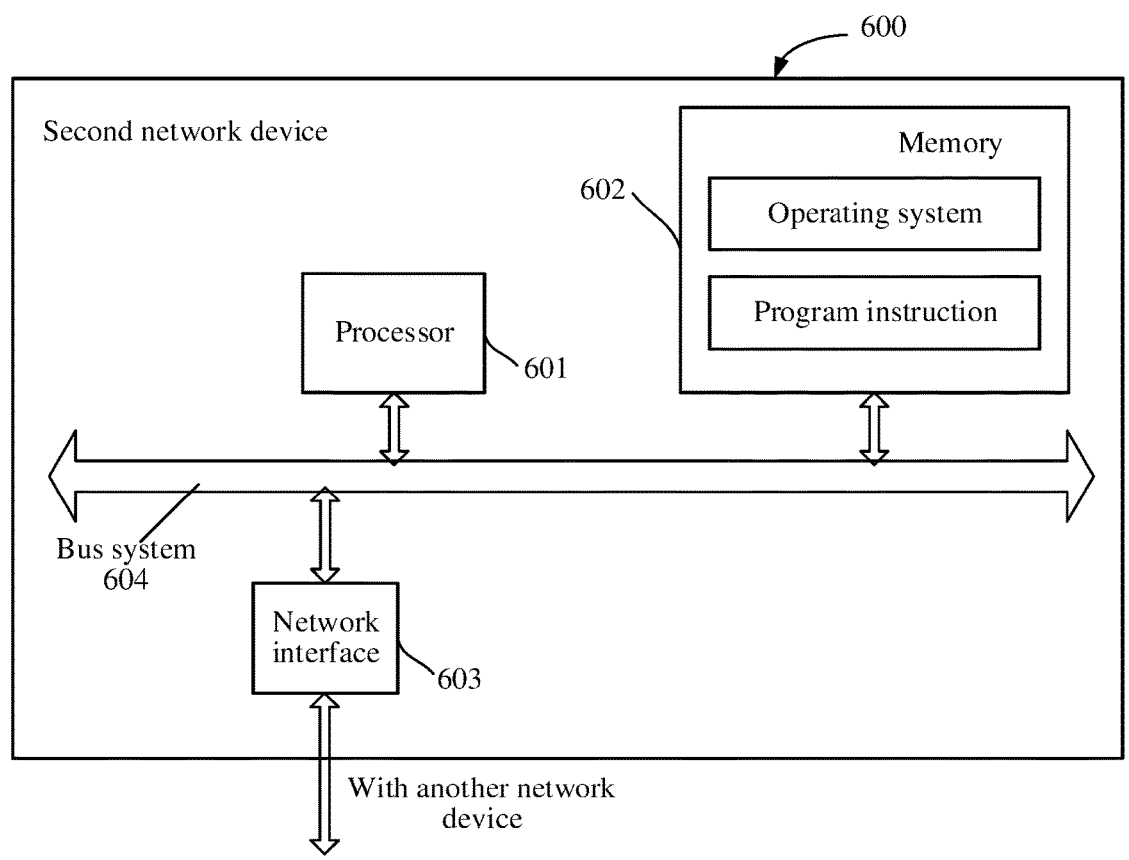
FIG. 10 is a schematic hardware composition diagram of a second network device according to an embodiment of the present application.

For implementation details of the second network device 600 shown in FIG. 10, refer to descriptions of the method embodiment shown in FIG. 5, and details are not described herein again.

From the foregoing descriptions of the implementation manners, a person skilled in the art may clearly understand that some or all steps of the methods in the embodiments may be implemented by software in addition to a universal hardware platform. Based on such an understanding, the technical solutions of the present application essentially or the part contributing to other approaches may be implemented in a form of a software product. The software product may be stored in a storage medium, such as a read-only memory (ROM), a RAM, a magnetic disk, or an optical disc, and includes several instructions for instructing a computer device (which may be a personal computer, a server, or a network device such as media gateway) to perform the methods described in the embodiments or some parts of the embodiments of the present application.

It should be noted that the embodiments in this specification are all described in a progressive manner, for same or similar parts in the embodiments, reference may be made to these embodiments, and each embodiment focuses on a difference from other embodiments. Especially, network device and system embodiments are basically similar to a method embodiment, and therefore are described briefly. For related parts, reference may be made to partial descriptions in the method embodiment. The described network device embodiment is merely exemplary. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. A person of ordinary skill in the art may understand and implement the embodiments of the present application without creative efforts.

The foregoing descriptions are merely optional embodiments of the present application, but are not intended to limit the protection scope of the present application. It should be noted that a person of ordinary skill in the art may make certain improvements and polishing without departing from the principle of the present application and the improvements and polishing shall fall within the protection scope of the present application.

What is claimed is:

1. A time synchronization method, comprising:
receiving, by a second network device, a first packet from a first network device, wherein the first packet comprises a first service frame and a first time value, wherein the first time value indicates when the first network device receives the first service frame, wherein the first packet further comprises a frequency offset $\Delta f$, $\Delta f = f1 - f2$, f1 is a first frequency determined based on a system clock of the first network device, and f2 is a second frequency determined based on a system clock of a radio equipment control (REC);
determining, by the second network device, the system clock of the REC based on the offset $\Delta f$;
sending, by the second network device based on the system clock of the REC, the first service frame extracted from the first packet to a radio equipment (RE) at a second time value; and
calculating, by the second network device based on the first time value and the second time value, a transmission delay between the first network device and the second network device.

2. The method according to claim 1, wherein determining the system clock of the REC comprises:
extracting, by the second network device, the frequency offset from the first packet; and
calculating, by the second network device, the system clock of the REC based on a system clock of the second network device and the frequency offset.

3. The method according to claim 2, wherein sending the first service frame extracted from the first packet to the RE comprises:
buffering, by the second network device, the first service frame extracted from the first packet into a memory;
reading, by the second network device, the first service frame from the memory using the system clock of the REC as a reading clock; and
sending, by the second network device, the first service frame to the RE, wherein a buffering duration of the first service frame in the memory is zero.

4. The method according to claim 1, wherein after calculating the transmission delay, the method further comprises:
receiving, by the second network device, a second packet from the first network device, wherein the second packet comprises a second service frame;
buffering, by the second network device, the second service frame into a memory;
reading, by the second network device, the second service frame from the memory using the system clock of the REC as a reading clock, wherein the second service frame is read a buffering duration after buffering the second service frame into the memory, and wherein the buffering duration of the second service frame in the memory is a fixed delay minus the transmission delay; and
sending the second service frame to the RE.

5. A first network device, comprising:
a processor; and
a non-transitory memory coupled to the processor and configured to store program instructions, wherein the program instructions cause the processor to be configured to:
receive a service frame carrying a system clock of a radio equipment control (REC), from the REC;
send a packet to a second network device,
wherein the packet comprises the service frame and a first time value at which the service frame is received by the first network device,
wherein the packet notifies a system clock of the REC and the first time value to the second network device, and
wherein the packet further comprises a frequency offset $\Delta f$, $\Delta f = f1 - f2$, f1 is a first frequency determined based on a system clock of the first network device, and f2 is a second frequency determined based on the system clock of the REC.

6. The first network device according to claim 5, wherein after receiving the service frame from the REC, the program instructions further cause the processor to be configured to:
extract the system clock of the REC from the service frame; and
calculate the frequency offset based on a system clock of the first network device and the system clock of the REC.

7. A second network device, comprising:
a non-transitory memory configured to store program instructions; and
a processor coupled to the memory, wherein the program instructions and the data stored in the memory cause the processor to be configured to:
receive a first packet from a first network device, wherein the first packet comprises a first service frame and a first time value, wherein the first time value indicates when the first network device receives the first service frame, wherein the first packet further comprises a frequency offset $\Delta f$, $\Delta f = f1 - f2$, f1 is a first frequency determined based on a system clock of the first network device, and f2 is a second frequency determined based on a system clock of a radio equipment control (REC);
determine the system clock of the REC based on the frequency offset $\Delta f$;
send, based on the system clock of the REC, the first service frame extracted from the first packet to a radio equipment (RE) at a second time value; and
calculate, based on the first time value and the second time value, a transmission delay between the first network device and the second network device.

8. The second network device according to claim 7, wherein when determining the system clock of the REC, the program instructions and the data further cause the processor to be configured to:
extract the frequency offset from the first packet; and
calculate the system clock of the REC based on a system clock of the second network device and the frequency offset.

9. The second network device according to claim 8, wherein when sending the first service frame extracted from the first packet to the RE, the program instructions stored in the memory further cause the processor to be configured to:
buffer the first service frame extracted from the first packet into a memory;

read the first service frame from the memory using the system clock of the REC as a reading clock; and send the first service frame to the RE, wherein a buffering duration of the first service frame in the memory is zero.

10. The second network device according to claim 7, wherein after calculating the transmission delay, the program instructions stored in the memory further cause the processor to be configured to:

receive a second packet from the first network device, wherein the second packet comprises a second service frame;

buffer the second service frame into the memory;

read the second service frame from the memory using the system clock of the REC as a reading clock, wherein the second service frame is read a buffering duration after buffering the second service frame into the memory, and wherein the buffering duration of the second service frame in the memory is a fixed delay minus the transmission delay; and send the second service frame to the RE.

11. The method according to claim 1, wherein the transmission delay is T, wherein the first time value is T1, wherein the second time value is T2, and wherein T=T2−T1.

12. The second network device according to claim 7, wherein the transmission delay is T, wherein the first time value is T1, wherein the second time value is T2, and wherein T=T2−T1.

* * * * *